Patented Sept. 30, 1941

2,257,189

UNITED STATES PATENT OFFICE 2,257,189

DISCHARGE PRINTING OF FABRICS, ETC.

Roscoe W. Parks, Hillside, N. J., assignor to Jacques Wolf & Co., Passaic, N. J., a corporation of New Jersey No Drawing. Application August 18, 1939, Serial No. 290,794

6 Claims. (Cl. 8—69)

Printing processes on fabrics or other textile or fibrous materials already dyed or pigmented may involve only the removal of the dye or pigment existing in the area treated. In this case the printing medium has heretofore consisted of a viscous, aqueous thickener or carrier, as a gum or paste or a mixture thereof, and a discharge or reducing agent.

These printing processes may also involve not only removal of the existing dye or pigment but also the application of another dye or pigment to the area treated. In this case the printing medium generally includes a viscous, aqueous thickener or carrier, as a gum or paste or a mixture thereof, the dye or pigment to be applied (also, if necessary, a water-miscible solvent for the dye), a fixer which assists in fixing or binding either chemically or mechanically the dye or pigment to the fabric, and a suitable discharge or reducing agent. When in this disclosure, I use the term "discharge" or "reducing" agent I mean one which is adapted in the co-presence of heat and moisture to remove or destroy the color already existing in the area treated. Such a discharge agent is usually sodium formaldehyde sulfoxylate ($Na_2HSO_2$, $CH_2O$, $2H_2O$), or sodium hydrosulfite ($Na_2S_2O_4$), though other similar compounds wherein the sodium is replaced by another element may be used.

When the printing processes involve the removal of the existing dye or pigment and the application of another dye or pigment to the area treated, the procedure is a long and involved one (including printing with the aqueous printing medium, evaporating the moisture therefrom to dry the print on the fabric, aging with steam to cause the reducing agent to remove the existing color, washing to leave on the treated area only the dye or pigment and the fixers for binding it to the fabric, and drying), not always leaving the dye or pigment securely fixed to the fabric.

It is more or less recently known to print without using an aqueous carrier, to-wit, by resort to a lacquer serving as a carrier and consisting of a solution of a cellulose acetate or nitrate ester: the procedure is simple and such lacquer, being water-insoluble, remains a good binder. But there is only application of color. There is no discharge of existing color; for accomplishing also that purpose the incorporation in the lacquer of a solution of the discharge agent (the two being incapable of forming a true or homogeneous mixture) was naturally regarded as a perfect obstacle.

Now my discovery essentially is that if the discharge agent is not used in the solution state but is dispersed in the carrier so as to exist in the state of substantially dry or water-free particles, as by being reduced to dry powdered form and in that state mixed with or in the carrier, a printing medium results which will effect discharge of coloring matter (dye or certain pigments, as a lake made from an acid dyestuff or Prussian blue) existing on the fabric. Such printing medium may contain a dye or pigment to be conveyed by the carrier to the fabric and in the case a pigment is used there need not be such a thick application of the printing medium, in view of the discharge which takes place, as to produce undue stiffness of or other deleterious effect on the fabric. I cannot account for the discharge action taking place, notwithstanding the discharge agent exists dry and immured in the lacquer or equivalent non-aqueous carrier except on the theory that during the steaming the carrier in some way comes to absorb the moisture and thus the discharge agent finds escape to the coloring matter on the fabric.

The amount of the discharge agent present in the carrier will of course vary, as will be understood by those skilled in this art, depending on the resistance to discharge of the coloring matter existing on the fabric.

As I have so far explained my invention the printing medium, while perfectly effective to discharge (with or without application of color) if used at once after preparation, may soon become deficient in its capacity to discharge, apparently because decomposition of the reducing agent sets in. The reason for this instability of such agent is apparently the presence in the carrier of traces of acid (either actual or latent) and of traces of water in either the carrier or reducing agent, or both. Wherefore I have found that if an alkaline dehydrating agent is present in the printing medium the mentioned decomposition is very materially retarded if not completely prevented, so that said medium remains in condition for use for a number of days, the elimination of the water apparently slowing up the action of the acid. Such a dehydrating agent should be substantially inert, since if it is strongly alkaline it will attack such cellulose compounds as go to compose the carrier, causing the latter to lose its viscosity and become too fluid to print. It should, in short, be capable of absorbing traces of water and thus render impotent any acid present in the carrier and also be sufficiently inert not deleteriously to affect the cellulose compounds or the discharge agent. For these purposes, then, the dehydrating agent should apparently be chosen from substances such as metallic oxides, hydroxides and carbonates. However, if color in the dehydrating agent so chosen may be a factor in preventing the attainment of the desired color or shade in the ultimate print I have found it best to resort to one which is light in color or actually colorless, as light calcined magnesia (MgO), which is white, thus possessing no pigment value; is capable of absorbing small quantities of water; readily neutralizes acids; and is mildly alkaline and so does not rapidly attack lacquer.

It will usually be found that, although an antiacid, as mildly alkaline, substance is thus used, a gradual reaction sets in between it and the lacquer which in time causes the latter to become too thin or low in viscosity for printing. To prevent or at least materially retard this reaction I have introduced into the printing medium an agent which, as the dehydrating agent tends progressively to thin the carrier, tends on the other hand progressively to thicken the same, thus serving as what I herein term a neutralizer, to-wit, in the sense that it counteracts the dehydrating agent, with the result that the viscosity of the carrier is kept substantially constant. For this purpose I find that a small quantity of calcium chloride (CaCl) will serve.

There will of course usually be also contained in the printing medium some coloring matter, as a pigment, which is immune to the discharge agent. On the application of the printing medium to the fabric and its subjection to heat and moisture, as by steaming, therefore, the discharge will be effected and the affected areas will now appear colored the same as the color existing in the deposit formed by the colored printing medium. In such case, since discharge takes place and there is no occasion to eclipse existing color by the color applied, there need not be such a thick application of the printing medium as to produce the undue stiffness which characterizes the conventional lacquer printing. Thus my invention makes possible production of a printed fabric which, being initially colored with dischargeable coloring matter, in the affected areas has such existing color reduced or discharged and each such area overlaid by a film or layer which has effected such discharge and itself is colored, the resulting printed fabric having the thus-altered areas sharply defined and its pattern being both permanent and durable.

Having thus fully described my invention, what I claim is:

1. The method of discharge-printing fibrous sheet material existing colored with dischargeable coloring matter which consists in applying to an area of the material so colored a viscous substantially water-free cellulose ester carrier containing a reducing discharge agent for such coloring matter existing as initially dry particles and subjecting such area to moisture in the presence of heat.

2. The method of discharge-printing fibrous sheet material existing colored with dischargeable coloring matter which consists in applying to an area of the material so colored a viscous substantially water-free cellulose ester carrier containing a reducing discharge agent for such coloring matter existing as initially dry particles and also containing coloring matter and subjecting such area to moisture in the presence of heat.

3. The hereindescribed medium for printing, with the aid of moisture in the presence of heat, fibrous sheet material colored with dischargeable coloring matter, such medium including a viscous substantially water-free cellulose ester carrier and, contained in the carrier, a reducing discharge agent for such coloring matter existing in the form of substantially dry particles.

4. The printing medium set forth in claim 1 characterized by coloring matter also contained in the carrier.

5. The printing medium set forth in claim 1 characterized by a dehydrating agent of the class specified also contained in the carrier.

6. The printing medium set forth in claim 1 characterized by a dehydrating agent of the class specified also contained in the carrier and by a neutralizer for said agent also contained in the carrier in substantially only the quantity required to prevent said agent from reacting with the lacquer.

ROSCOE W. PARKS.